United States Patent
Manthei (10) Patent No.: US 9,475,215 B2
(45) Date of Patent: Oct. 25, 2016

(54) FORM FOR CASTING A CONCRETE LIGHT POLE BASE

(71) Applicant: Redi-Rock International, LLC, Charlevoix, MI (US)

(72) Inventor: Benjamin R. Manthei, Petoskey, MI (US)

(73) Assignee: Redi-Rock International, LLC, Charlevoix, MI (US)

( * ) Notice: Subject to any disclaimer, the term of this patent is extended or adjusted under 35 U.S.C. 154(b) by 395 days.

(21) Appl. No.: 14/210,613

(22) Filed: Mar. 14, 2014

(65) Prior Publication Data

US 2014/0312529 A1   Oct. 23, 2014

Related U.S. Application Data

(60) Provisional application No. 61/789,194, filed on Mar. 15, 2013.

(51) Int. Cl.
| | | |
|---|---|---|
| *B29C 39/10* | (2006.01) | |
| *E04G 15/06* | (2006.01) | |
| *E04G 21/14* | (2006.01) | |
| *E04G 21/18* | (2006.01) | |
| *E04G 9/10* | (2006.01) | |
| *E04G 13/02* | (2006.01) | |

(52) U.S. Cl.
CPC ............. *B29C 39/10* (2013.01); *E04G 15/061* (2013.01); *E04G 21/142* (2013.01); *E04G 21/185* (2013.01); *E04G 9/10* (2013.01); *E04G 13/021* (2013.01)

(58) Field of Classification Search
CPC ........ B29C 39/10; E04G 9/10; E04G 13/021
See application file for complete search history.

(56) References Cited

U.S. PATENT DOCUMENTS

| | | | | |
|---|---|---|---|---|
| 5,740,645 | A | * | 4/1998 | Raby ....................... E02D 27/42 248/346.5 |
| 7,984,541 | B1 | | 7/2011 | Davidson |
| 2004/0227053 | A1 | | 11/2004 | Manthei |
| 2010/0000175 | A1 | | 1/2010 | Johnson et al. |
| 2012/0261545 | A1 | * | 10/2012 | Morstatter ............ E04G 13/021 249/48 |
| 2012/0324825 | A1 | * | 12/2012 | Vrame .................. E04G 21/185 52/745.21 |

* cited by examiner

*Primary Examiner* — James Sanders
(74) *Attorney, Agent, or Firm* — Anthony Klemptner (57) ABSTRACT

A process and form for casting a concrete light pole base having a decorative upper portion with a configuration for mounting a light pole. The form includes a base having an opening in which a resilient insert is positioned. The insert has openings for holding threaded ends of mounting bolts and for positioning wiring conduits. Ends of the bolts extend from the insert into the mold cavity. Different inserts may be used to accommodate different light pole mounting specifications. A first form section for shaping a decorative upper portion of the light pole base is positioned on the base, and forms for shaping the cylindrical lower end of the light pole base are secured above the first form section.

4 Claims, 9 Drawing Sheets

FORM FOR CASTING A CONCRETE LIGHT POLE BASE

STATEMENT REGARDING FEDERALLY SPONSORED RESEARCH OR DEVELOPMENT

Not Applicable.

TECHNICAL FIELD

The invention relates to cast concrete products and specifically to a process and a form for casting a concrete light pole base suitable for mounting a light pole of the type used, for example, in parking lots and for highway lighting.

BACKGROUND OF THE INVENTION

Tall light poles are used, for example, for parking lot lighting and for highway lighting. The lower end of a light pole has a pattern of holes for receiving bolts which are embedded in a concrete base. The layout and spacing of the holes, hole diameters and number of holes can vary between lighting pole manufacturers and between different size and different model poles made by the same manufacturer. Concrete light pole bases are typically a cylindrical concrete column having a round exterior and a flat top from which the threaded ends of embedded bolts extend. The number, size and spacings of the bolts are determined by the hole pattern in the base of the light pole which will be mounted on the base. One or more conduits are embedded in the concrete base for feeding underground wiring to a light fixture mounted on the light pole. The height of the pole base is based on the size of the light pole and the light fixtures mounted on the pole to provide the necessary stability for the light pole, and to the height the base is to extend above ground. In parking lots, for example, it may be desirable to have the base extend sufficiently above ground to prevent vehicle damage to the light pole.

The specification for a light pole base bolt pattern are based on the base configuration of a specific light pole which will be mounted on the base. A hole is drilled into the ground for receiving the light pole base. The diameter of the hole is based on the diameter of the base and the depth of the hole is determined by the total length of the base less the amount that the base is to extend above the ground surface. The light pole is bolted to the base and electrical wires extend through one or more conduits in the base and up through the light pole for powering lighting fixtures which will be attached to the pole. The minimum dimensions of the portion of the base which will be embedded in the ground will be influenced by the size of the pole to be mounted on the base and the properties of the soil in which the base is buried.

The portion of a typical concrete pole base which extends above the ground has been an extension of the round cylinder which is embedded in the ground. From an architectural point of view, it is unattractive.

BRIEF SUMMARY OF THE INVENTION

The invention is directed to a form and process for casting concrete light pole bases in which the portion of the base which will extend above the ground may be shaped to simulate a desired decorative appearance such as simulating stacked stone blocks, a ribbed appearance or to provide another desired appearance. The form facilitates providing different bolt patterns for mounting different configured light poles on the cast base and for positioning wiring conduits to align with a light pole mounted on the base.

Various objects and advantages of the invention will become apparent from the following detailed description of the invention and the accompanying drawings.

DETAILED DESCRIPTION OF THE INVENTION

Figure 1:
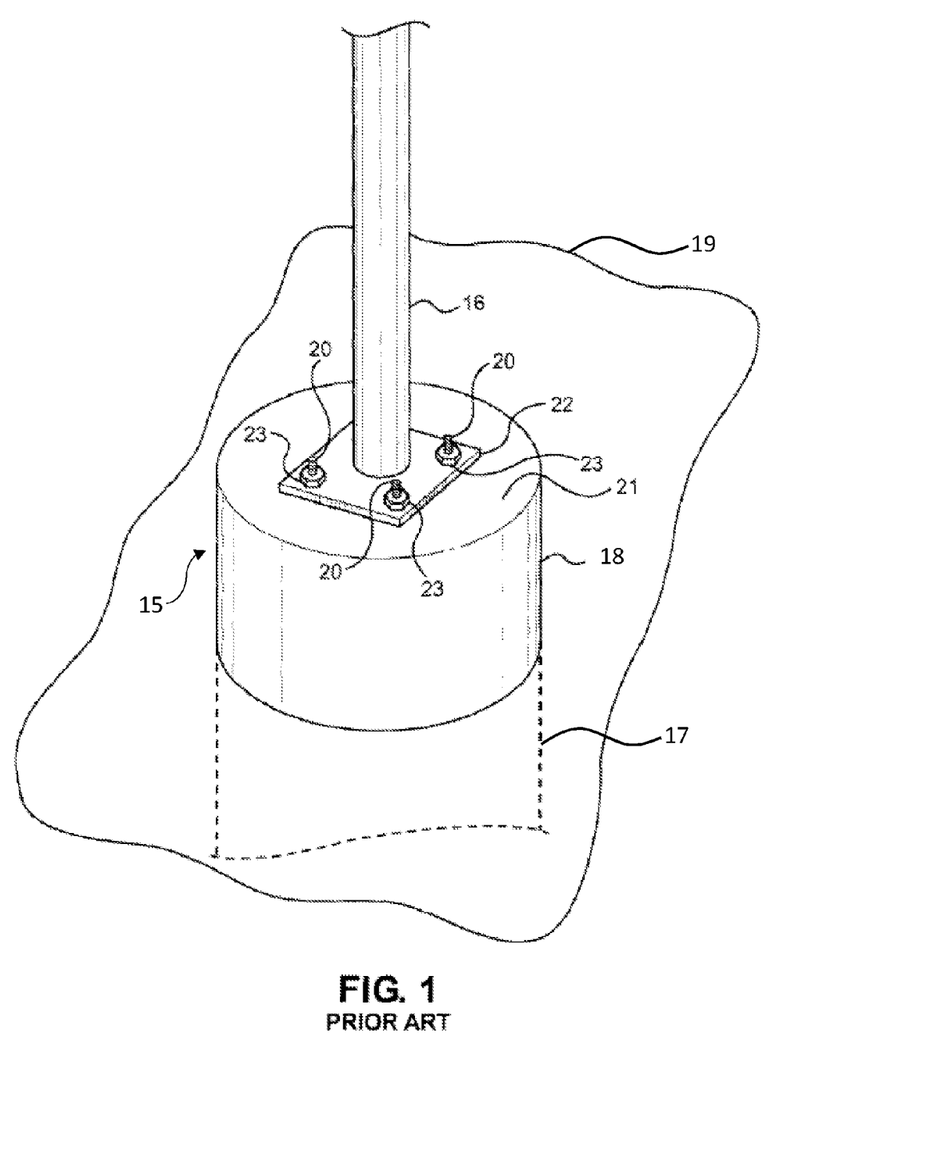
FIG. 1 is a fragmentary perspective view of a portion of a cylindrical prior art concrete light pole base which extends above the ground and a portion of a light pole secured to the base.

Referring to the drawings, FIG. 1 shows a fragmentary portion of a prior art cast concrete light pole base 15 and an attached lower end of a light pole 16. The light pole base 15 is cylindrical in shape and has a lower portion 17 which is buried in the ground and an upper portion 18 which may be located close to the ground surface 19 or extend above the ground surface 19, as shown. When the light pole base 15 is located in a surface parking lot, it is typically installed with the upper portion 18 extending a sufficient distance above the ground surface 19 to protect the light pole 16 from vehicle damage. The dimensions of the light pole base are designed to provide stability for the light pole 16 which will be mounted on the base 15. Various factors including the height, weight and wind resistance of the light pole and lighting fixtures mounted on the pole, and the properties of the ground in which the light pole base will be installed are considered in determining the diameter of the base 15 and the depth that the light pole base extends into the ground.

A plurality of bolts 20 are embedded in a top 21 of the light pole base 15 for attaching a lower end 22 of the light pole 16 to the base 15. A lower end 22 of the light pole 16 will have a pattern of holes for receiving the bolts 20. The number and orientation of the bolts 20 will be determined by the hole pattern in the lower end 22. Smaller light poles 16 may require only three mounting bolts 20 of a relatively smaller diameter to secure the light pole 16 to the base 15, while a larger light pole 16 may require four or more larger diameter mounting bolts 20 to provide sufficient strength. Nuts 23 are attached to the bolts 20 to secure the light pole 16 to the base 15.

Figure 2:
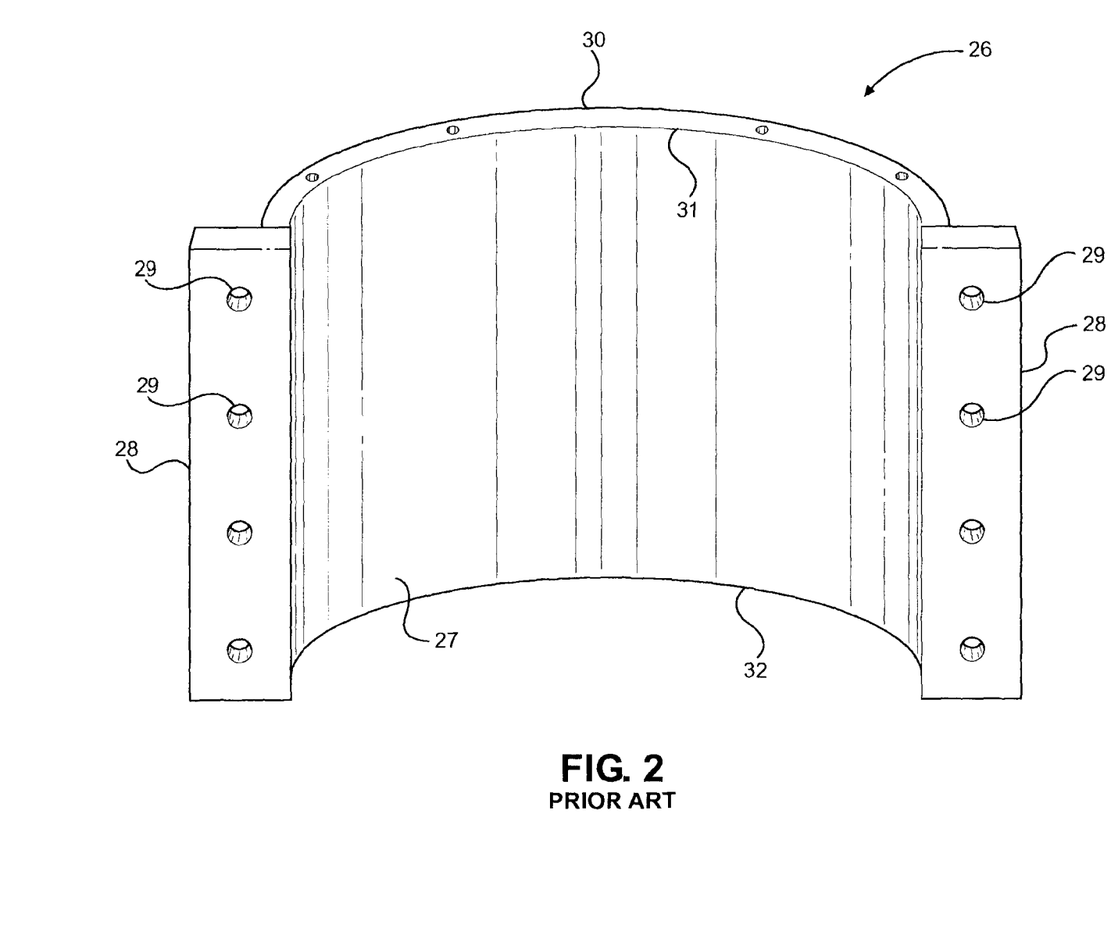
FIG. 2 is a perspective view of one half section of a prior art form used to cast the concrete light pole base of FIG. 1.

The prior art cylindrical cast concrete light pole base 15 may be assembled from two or more form sections 26 of the type shown in FIG. 2. Each form section 26 has a curved interior wall 27 which forms part of a cavity in which the light pole base 15 is cast. Each form sections 26 has a vertical side flange 28 which is shown having a plurality spaced bolt holes 29. The flanges 28 on two of the form sections 26 are bolted, clamped or otherwise secured together to define a cylindrical cavity in which the light pole base 15 is cast. The form sections 26 also may include a curved upper flange 30 extending outwardly along a curved top edge 31 of the section 26 and a corresponding curved lower flange (not shown) extending outwardly along a curved lower edge 32 of the sections 26. The form sections 26 may be provided in different lengths for forming different length light pole bases. For example, a light pole base manufacturer may have pairs of sections 26 in 4 foot, 8 foot and 12 foot lengths. Two 4 foot sections, for example, may be bolted together with two 12 foot sections for manufacturing a 16 foot light pole base.

Figure 3:
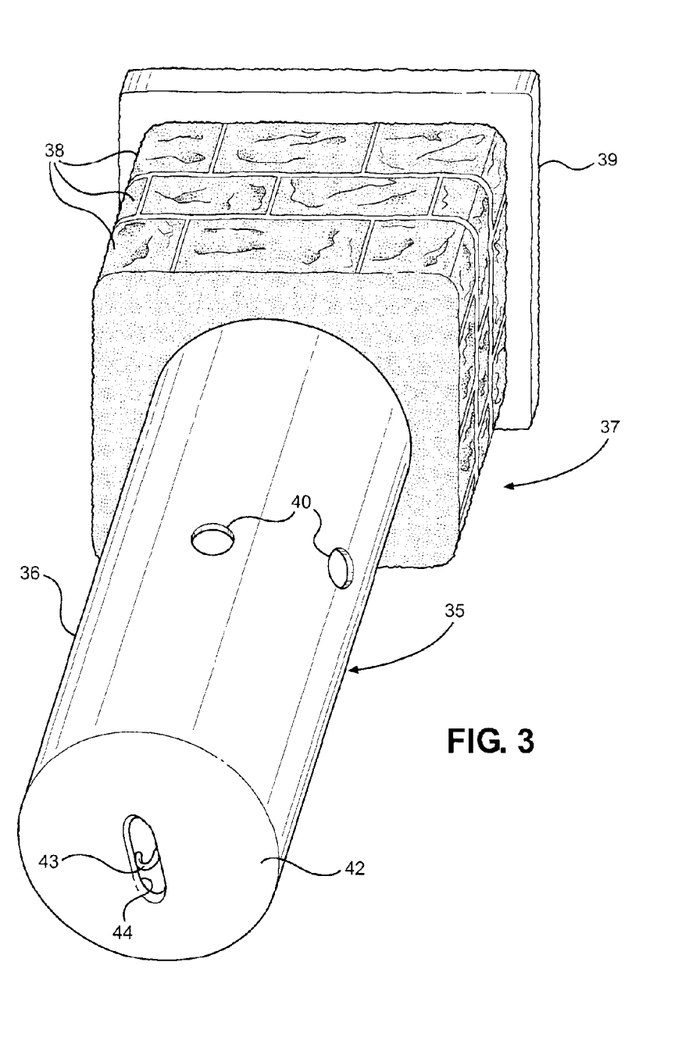
FIG. 3 is a perspective side view as seen from the lower end of a concrete light pole base made using a form according to the invention.

The visible portion of the above described prior art light pole bases are functional, but not very attractive. For upscale installations, it would be desirable to have a more attractive light pole base, for example, one having the appearance of stacked natural stone blocks, bricks, or another pleasing appearance. According to the present invention, a form is provided for casting the visible above ground portion of a light pole base. FIG. 3 is a perspective view showing a exemplary light pole base 35 cast according to the present invention. The light pole base 35 has a cylindrical lower portion 36 which, in use, will be embedded in the ground during use and has a textured upper portion 37 which will extend above the ground surface. In the illustrated embodiment, the upper portion 37 is generally square when viewed from the top and has the appearance of a stack of irregular shaped stone blocks 38 and a simulated stone top cap 39 with simulated mortar joints between the blocks 38 and between the blocks 38 and the top cap 39. However, it will be appreciated that the upper portion 37 may be rounded and may have different appearances other than blocks. One or more conduits (not shown) are embedded in the pole base to connect one or more openings 40 in the lower portion 36 with one or more openings 41 (FIGS. 5 and 6) near the top center of the top cap 39 for feeding electrical wires from underground conduits (not shown) to a lighting fixture mounted on a light pole supported on the base 35.

Figure 4:
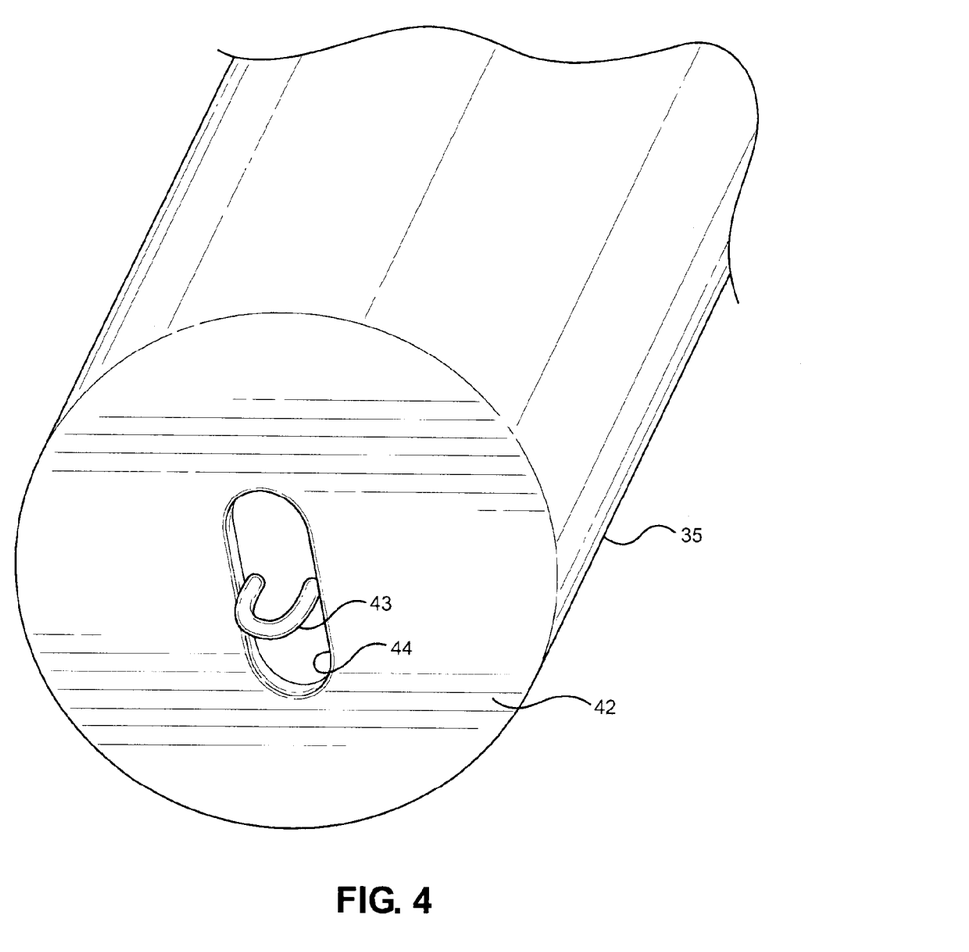
FIG. 4 is a fragmentary perspective view of the lower end of the light pole base of FIG. 3 showing details of a lifting hook embedded in the concrete light pole base.

During manufacture, the light pole base 35 is cast upside down in a form, with the cap 39 located at the bottom of the form. FIGS. 3 and 4 show a bottom 42 of the lower base portion 36. Preferably, an optional hook 43 is shown embedded in the bottom 42 of the lower portion 36 to extend in a recess 44. The hook 43 provides a point for lifting the inverted light pole base 35 from the form in which it was cast after the concrete has sufficiently cured. The hook 43 may be formed, for example, from a bent section of rebar embedded in the concrete.

Figure 5:
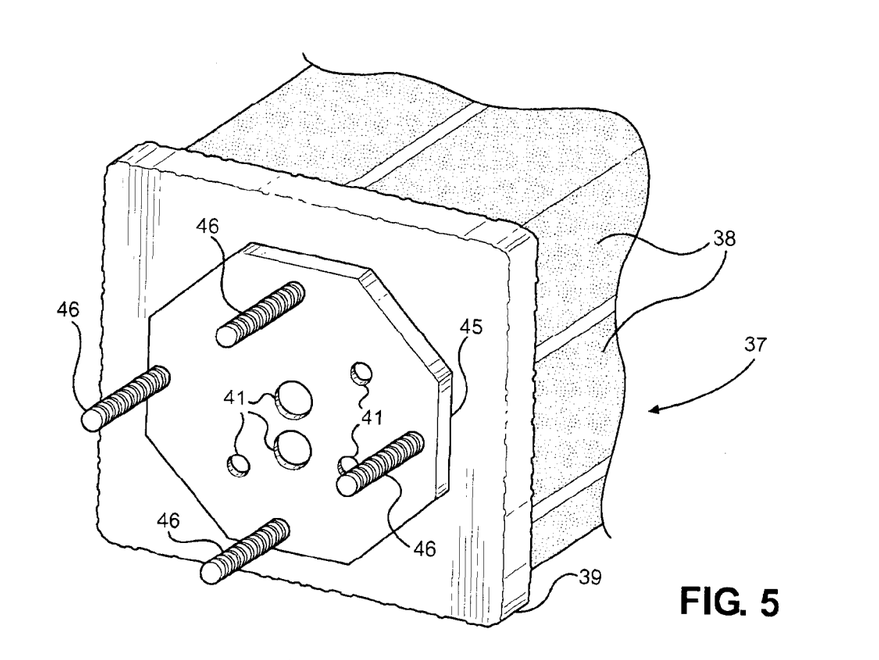
FIG. 5 is a perspective view of the top of a concrete light pole base laying on its side which was formed according to the invention and showing a first exemplary pattern of mounting bolts and wiring conduit openings.

The cap 39 at the top of the light pole base 35 is specifically configured for the mounting requirements of a specific light pole (not shown) which will be mounted on the base 35. FIG. 5 shows an exemplary top cap 39 which preferably has a slightly raised center portion 45 where a large light pole will be mounted. When a raised center portion 45 is provided, it will reduce the likelihood of water on the cap 39 from seeping between the light pole and the cap 39 and entering the wiring conduit openings 41. The illustrated center portion 45 is octagonal. However, other shapes may be provided, if desired. Threaded ends of 4 bolts 46 which are embedded in the upper portion 37 extend from the cap 39 for securing a light pole to the base 35. The size and spacing and number of bolts 46 will be determined by the hole size and spacing on a base of the light pole. The number, size and configuration of the bolts will vary between different light pole manufacturers and between different light pole models made by each manufacturer. For large light poles, for example, one inch bolts may be used while smaller light poles may only need ¾ inch bolts. The number and location of wiring conduit openings 40 and 41 in the base also will be determined by the wiring layout for the light pole and for nearby light poles connected to the same electrical circuit.

Figure 6:
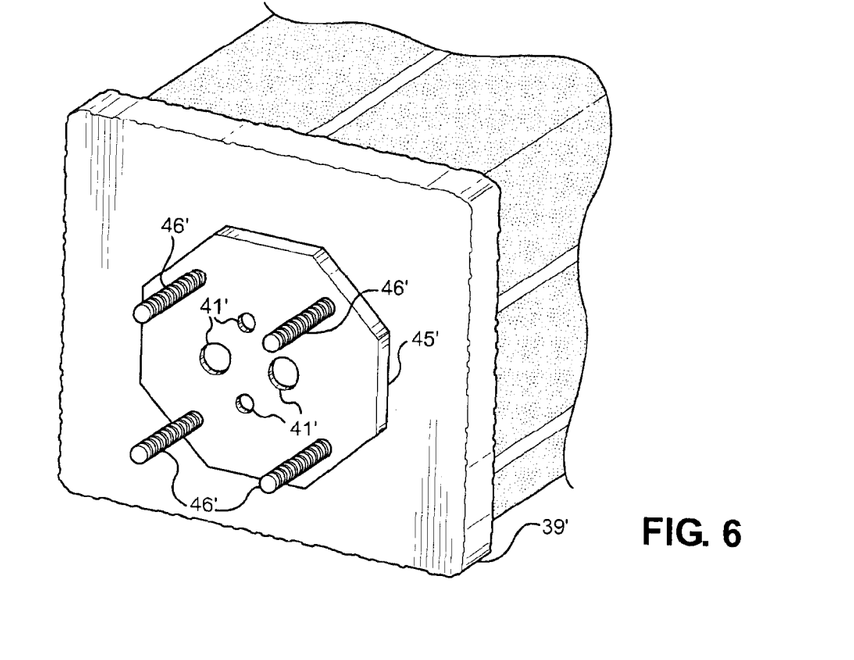
FIG. 6 is a perspective view of the top of a concrete light pole base laying on its side which was formed according to the invention and showing a second exemplary pattern of mounting bolts and wiring conduit openings.

FIG. 6 shows an exemplary smaller raised center portion 45' on a base cap 39', with a different pattern of smaller bolts 46' and with four conduit openings 41'. The center portion 45' shown in FIG. 6 is smaller than in FIG. 5 and is configured for mounting a smaller light pole than the center portion 45 of FIG. 5. Here the bolts 46' may, for example, have a ¾ inch diameter. It should be noted that in each case, the bolt size is based on the light pole manufacturer's specifications for the pole which will be mounted on the base. The illustrated conduit openings 41' are shown having different diameters based on the number and size of wires which will be passed through each conduit.

Figure 7:
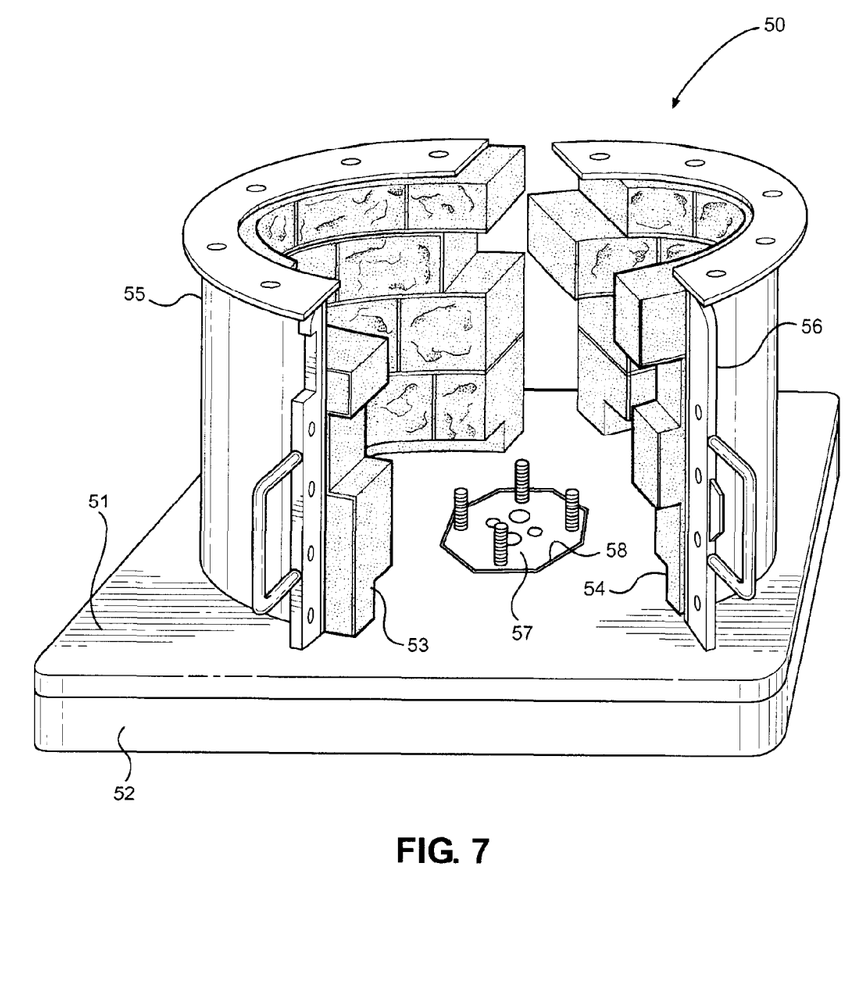
FIG. 7 is a perspective view of an open form according to the invention in which the above ground portion of a concrete light pole base is cast.

FIG. 7 shows an open form 50 according to one embodiment of the invention for casting the textured upper portion 37 of a light pole base 35. A textured polyethylene mat 51 is supported on a steel base 52. The mat 51 imparts a desired texture to an upper surface of the light pole top cap 39. In the illustrated embodiment, two polyethylene mold sections 53 and 54 are provided for defining the sides of the upper portion of the light pole base. The two mold sections 53 and 54 are supported, respectively, by two steel jackets 55 and 56 which are supported on the base 52. It should be appreciated that more than two mold sections and steel jackets may be used to form the mold cavity. In FIG. 7, the mold sections and steel jackets are shown in an open position which allows removal of a cured concrete light pole base from the form 50. When mold sections 53 and 54 and the steel jackets 55 and 56 are moved to a closed position and secured together with bolts or clamps, they define a mold cavity in which the sides are formed by the textured surfaces of the mold sections 53 and 54 and the cavity bottom is formed by the mat 51 and an insert 57. When in the closed position, the steel jackets 55 and 56 are secured to the base plate 52 to maintain alignment with the mat 51 and for stability.

When casting a concrete light pole base, one or more pairs of the cylindrical form sections 26 are stacked above the form 50 to form the cylindrical lower portion 36 of the light pole base 35. Adjacent forms sections are secured together, for example, with bolts or with clamps.

In the illustrated embodiment of the form 50, one half of the cavity of the upper portion of the light pole base is defined by the mold section 53 and the other half is defined by the mold section 54. When the upper portion of the light pole base has a generally square cross section, each mold section will form two sides of the upper portion. It will be appreciated that the mold cavity may be formed by more than two mold sections, such as a separate section forming each side of the upper portion of the light pole base. It also will be appreciated that although the mold sections 53 and 54 are illustrated for shaping simulated stacked stone blocks covered by a top block, the mold sections may be configured to impart any desired decorative appearance to the upper portion of the light pole base.

According to one feature of the form 50, an insert 57 is shown positioned in an opening 58 located in the center of the mat 51 and the base 52. Different configured inserts 57 can be positioned in the mat and base opening to extend either slightly below the textured surface of the mat 51 at the opening 58 or flush with the textured surface. Preferably, the insert 57 and the mat 51 are formed from a tough, resilient material, such as a polyurethane. The central opening 58 preferably has shaped sides which allow aligning the insert 57 in the mold cavity. In the illustration, the central opening 58 has an octagonal shape. However, it should be appreciated that other shapes may be used. When the upper surface of the insert 57 is slightly recessed below the upper surface of the mat 51, it will form a slightly raised surface on the top center of the cast cap 39 in the area where the light pole is mounted on the light pole base. This reduces the risk of water flowing into the conduit openings on the light pole base.

Figure 8:
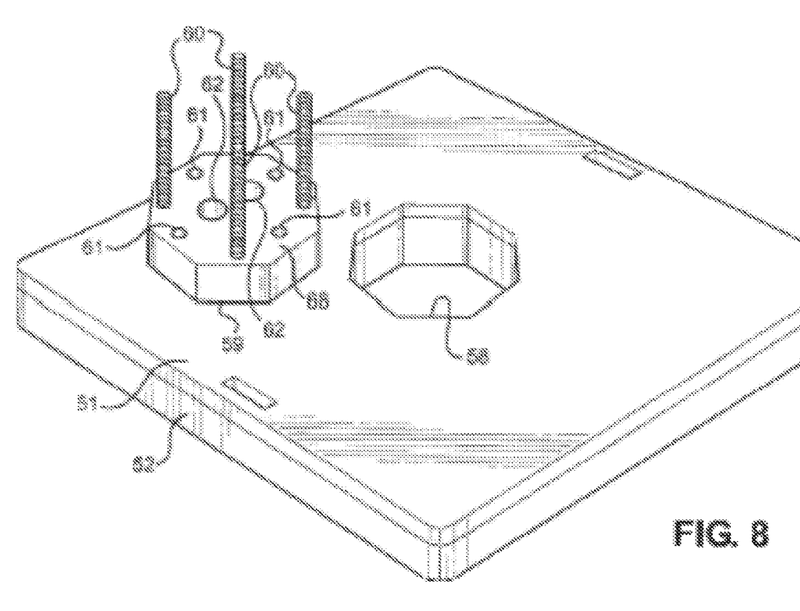
FIG. 8 is a perspective view of a base plate which supports the form in which the above ground portion of a concrete light pole base is cast and showing an insert for positioning the light pole mounting bolts and wiring conduits.

An insert 59 shown in FIG. 8 has openings 61 in which threaded ends of bolts 60 are positioned and frictionally held. The bolts 60 are firmly held in a desired position to extend into a mold cavity above the insert 59 for embedding in a cast concrete light pole base. By snugly holding the threaded ends of the threaded bolt ends in the insert 59, the threads will not be contaminated with cement when a light pole base is cast in the form. The bolt holes are located to correspond to the bolt hole spacing and pattern on a light pole which will be mounted on the base. Preferably, the insert 59 will have a number of bolt holes for arranging the bolts in different patterns according to the requirements for different light poles. The unused bolt holes in the insert are filed with removable plugs when casting a light pole base. Thus, the number of bolts, the size of the bolts and the spacing of the bolts can be quickly changed when casting light pole bases for use with different configured light poles. It should be appreciated that the insert 59 may be formed from, for example, a tough, resilient material such as polyurethane so that it can be removed intact from a cast light pole base for reuse, or may be formed from a disposable material intended for a single use.

Threaded ends of the bolts 60 which will project from the top of the light pole base are retained in the insert 59 while the light pole base is cast. The insert 59 has sufficient depth to protect the threaded ends from the concrete during casting of the base. If desired, the threaded ends may be coated with a grease or lubricant which will facilitate pushing the threaded ends into the insert and also prevent concrete from adhering to the threads. When a cast concrete light pole base is lifted from the form in which it was cast, the insert 57 will remain on the projecting threaded bolt ends. The insert 57 will protect the threaded bolt ends until it is removed from the light pole base. Typically, the inverted cast light pole base will be lifted from the open form using the embedded hook 43 in the bottom 42, and the light pole base will be laid on its side. The insert 57 will then be pulled from the threaded bolt ends which project from the top of the light pole base. A plate (not shown) with a hook on it may be secured to the threaded bolts projecting from the top of the light pole base for lifting the light pole base and lowering the light pole base into a cylindrical hole in the ground.

When a cast light pole base is withdrawn from the mold cavity and the insert 59 is separated from the light pole base the threaded bolts 60 extend above the top of the light pole base in a pattern configured to receive and secure the base of a light pole. The ends of the bolts 60 visible in FIG. 8 extend into the mold cavity for embedding the bolts 60 in the concrete light pole base. To provide a sufficient length for securing large light poles to the base, the bolts 60 may extend some distance into the base and may have hooked or other shaped ends for securely anchoring the bolts in the hardened concrete.

FIG. 8 shows details of the base 52, the mat 51, the opening 58 in the mat 51 and the insert 59. It will be seen that the thickness of the insert 59 is sufficient to completely enclose the threaded end portions of the bolts 60 which will extend above the top of the cast concrete light pole base. The opening 58 may have a depth so that a top surface 68 on the insert 59 is either flush with a top surface on the mat 51, or is recessed slightly below the top surface. When the surface 68 is recessed below the mat surface, the center portion 45 on the top cap 39 be raised above the upper surface of the top cap 39. When the surfaces are flush, the center portion 45 on the light pole base will be flush with the upper surface of the top cap 39.

Figure 9:
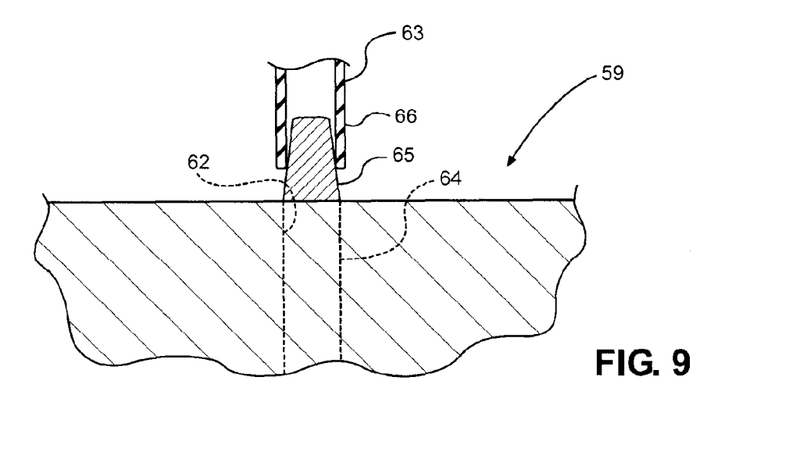
FIG. 9 is a fragmentary side view of a portion of an insert showing a bushing securing an end of a wiring conduit to the insert.

FIGS. 8 and 9 show holes 62 in the insert 59 for positioning wiring conduits in the cast light pole base. The wiring conduits (not shown) may be, for example, of plastic or of aluminum. An end of a wiring conduits may be inserted into the holes 62, or a bushing 64 may be inserted into each hole 62. The bushing 64 has a tapered projecting end 65, as seen in FIG. 9. An end of the conduit 63 is inserted over and seated on the bushing end 65 to form a seal while the light pole base concrete hardens. When the insert 59 is separated from the cast light pole base, the bushing 64 will pull free from the conduit end 66, leaving a wiring opening flush with the top of the light pole base. Alternately, a rod (not shown) may be positioned in each hole 62 and a bushing 64 may be positioned on the rod. Any unused holes 62 in the insert 59 are plugged when casting a light pole base. A similar bushing is attached to the inside of a form which casts the lower portion of the light pole base for positioning a lower end of the conduit to form the lower conduit openings 40 of FIG. 3.

Figure 10:
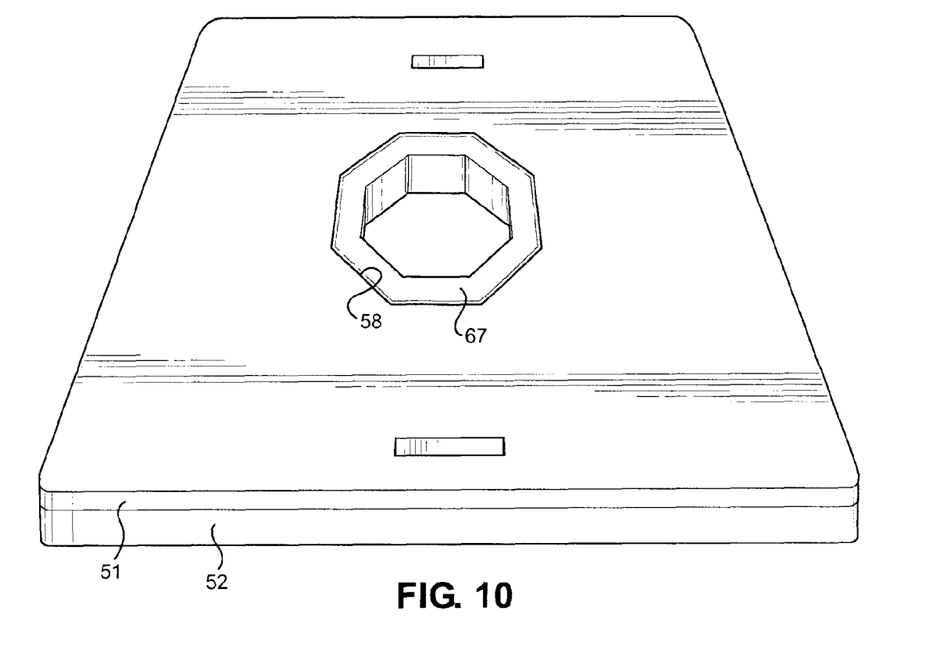
FIG. 10 is a perspective view of a base plate which supports the form in which the above ground portion of a concrete light pole base is cast and showing modified inserts for positioning the light pole mounting bolts and wiring conduits.

When the light pole base is used with smaller light poles, the center portion 45 may be smaller to fit with a smaller base on the light pole. As shown in FIG. 10, an adapter 67 may be placed in the opening 58 for receiving a smaller size insert (not shown). Preferably, the adapter 67 will be flush with the mat 51. The top surface of the insert also may be flush with the adapter 67 and the mat 51 or may be recessed for providing a raised surface for mounting the light pole.

The cylindrical lower portion 11 of the light pole base 10 which is buried in the ground may be formed with conventional forms of the type shown in FIG. 2 used for casting cylindrical light pole bases. These forms are mounted on top of the closed form 50 to extend above the cavity formed by the mold sections 53 and 54. Typical forms are semicircular elongated shells which are secured together while the concrete light pole base is cast and cures, and are separated from the cast light pole base before opening the form. The shells may have a sufficient length to cast a light pole base having the desired length lower portion 11, or two or more shells may be stacked to achieve the desired length. It will be noted that the minimum length of the lower portion will be determined by the configuration of the light pole and the soil conditions to provide a stable base for the light pole.

Figure 11:
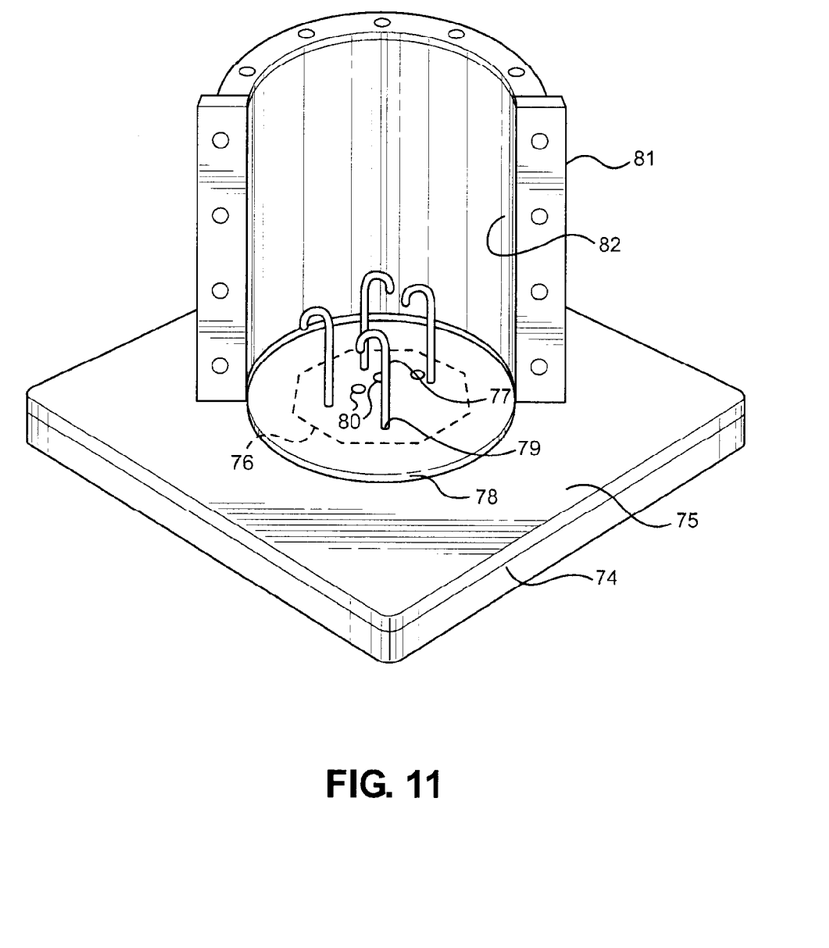
FIG. 11 is a further modified insert on a base plate for positioning light pole mounting bolts and wiring conduits.

FIG. 11 shows a modified embodiment for casting a concrete light pole base. A base 74 and mat 75 are similar to the previously described base and mat. A resilient insert 76 located in an opening in the base 74 and mat 75 extends flush with the top of the mat 75. The insert is provided with several sets of holes for positioning bolts 77 in different configurations for mounting different configured light poles on a cast light pole base and for different conduit configurations. A polyurethane cover 78 is placed over the insert and is sized to shape the top of surface of the light pole base. The cover 78 is provided with bolt holes 79 and conduit positioning holes 80 which align with specific holes in the insert 76. The cover 78 covers all holes in the insert 76 which are not required for the light pole base being cast. Different covers 78 are provided to accommodate the hole requirements for mounting different light poles. Depending on the light pole mounting configuration, a cover 78 is selected.

A section 81 of a form for defining a portion of the upper portion of the light pole base is shown having a cylindrical interior 82 for casting a cylindrical upper portion. The interior is illustrated as having vertical flat areas for simulating vertical boards on the exposed upper portion of the cast concrete light pole base. So long as the form configuration provides sufficient relief so that it can be easily separated from the hardened concrete, the interior 82 may be made of steel or another hard material. However, if the textured upper surface will have areas which will not release from a hard form, the texture must be created in a resilient liner, for example, a polyurethane liner, which will release from the hardened concrete.

It will be appreciated that various modifications and changes may be made to the above described preferred embodiments of a form for casting concrete light pole bases without departing from the scope of the following claims.

The invention claimed is:

1. A form for casting a concrete light pole base for supporting a light pole having a lower end with a plurality of bolt holes, comprising a rigid base having an opening in an upper surface, an insert in said base opening having a plurality of bolt openings shaped to receive and hold threaded ends of a plurality of bolts with free ends of the bolts extending from the insert and wherein said bolt openings are arranged to position the threaded ends of the bolts for alignment with bolt holes on a light pole, a form supported on said rigid base, said form defining a mold cavity having said insert located in a bottom of the cavity whereby free ends of bolts held by said insert extending into the cavity, and further including a resilient mat positioned on said rigid base, said mat having an opening aligned with said base opening, wherein said insert and said mat each have an upper surface, wherein said insert upper surface is recessed below said mat upper surface, and wherein said insert is positioned on said mat.

2. A form for casting a concrete light pole base, as set forth in claim 1, wherein said insert has at least two sets of bolt openings arranged to position bolts for at least two different light pole bolt hole configurations, and a plurality of removable plugs closing unused bolt holes when casting a light pole base in the cavity.

3. A form for casting a concrete light pole base, as set forth in claim 1, and further including a plurality of inserts having different bolt hole configurations with each bolt hole configuration arranged for positioning the threaded bolt ends for engaging hole configured on different light poles, and wherein the insert.

4. A form for casting a concrete light pole base, as set forth in claim 2, wherein said insert has at least two sets of bolt openings arranged to position bolts for at least two different light pole bolt hole configurations, and an insert cover having holes aligned with one of the sets of bolt openings for a specific light pole base and covering all other bolt holes in the insert.

\* \* \* \* \*